Oct. 8, 1963

C. W. BOLLUM, SR 3,106,260

EARTH-SKIMMING AIR VEHICLE WITH PRESSURE
RESPONSIVE VALVE MEANS

Filed Dec. 16, 1959

INVENTOR.
Carl W. Bollum, Sr.
BY
ATTORNEY

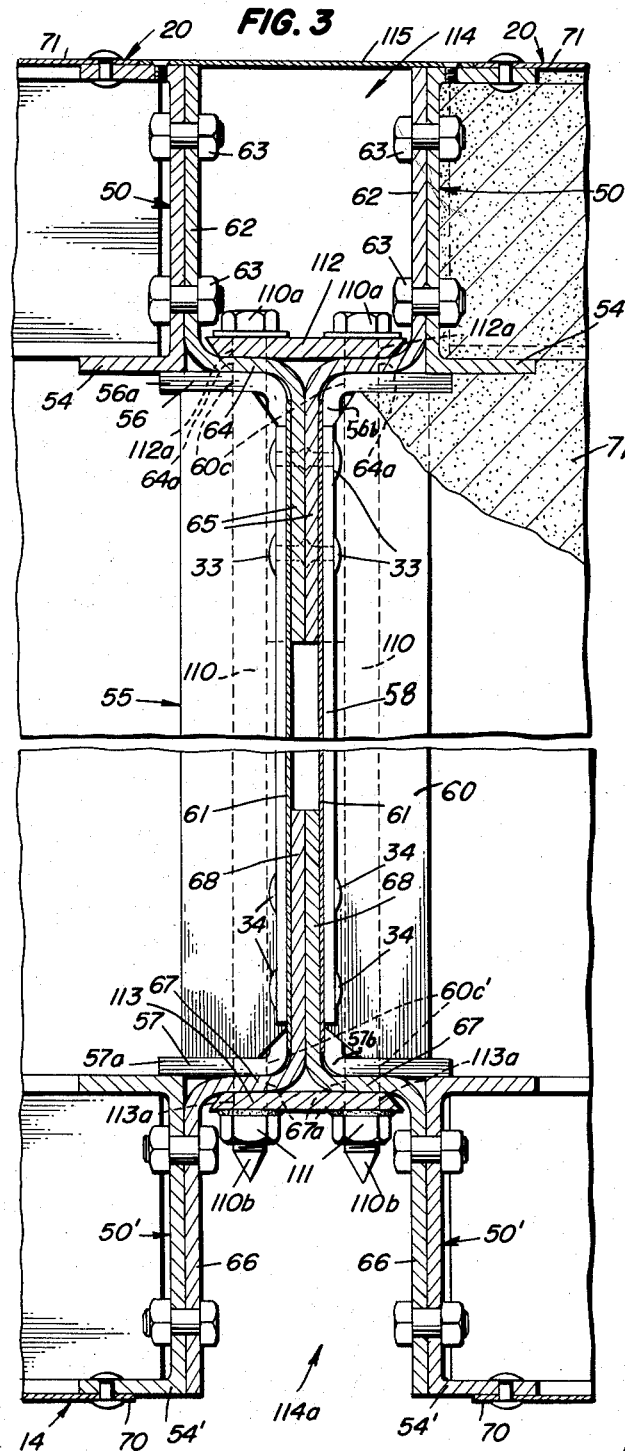

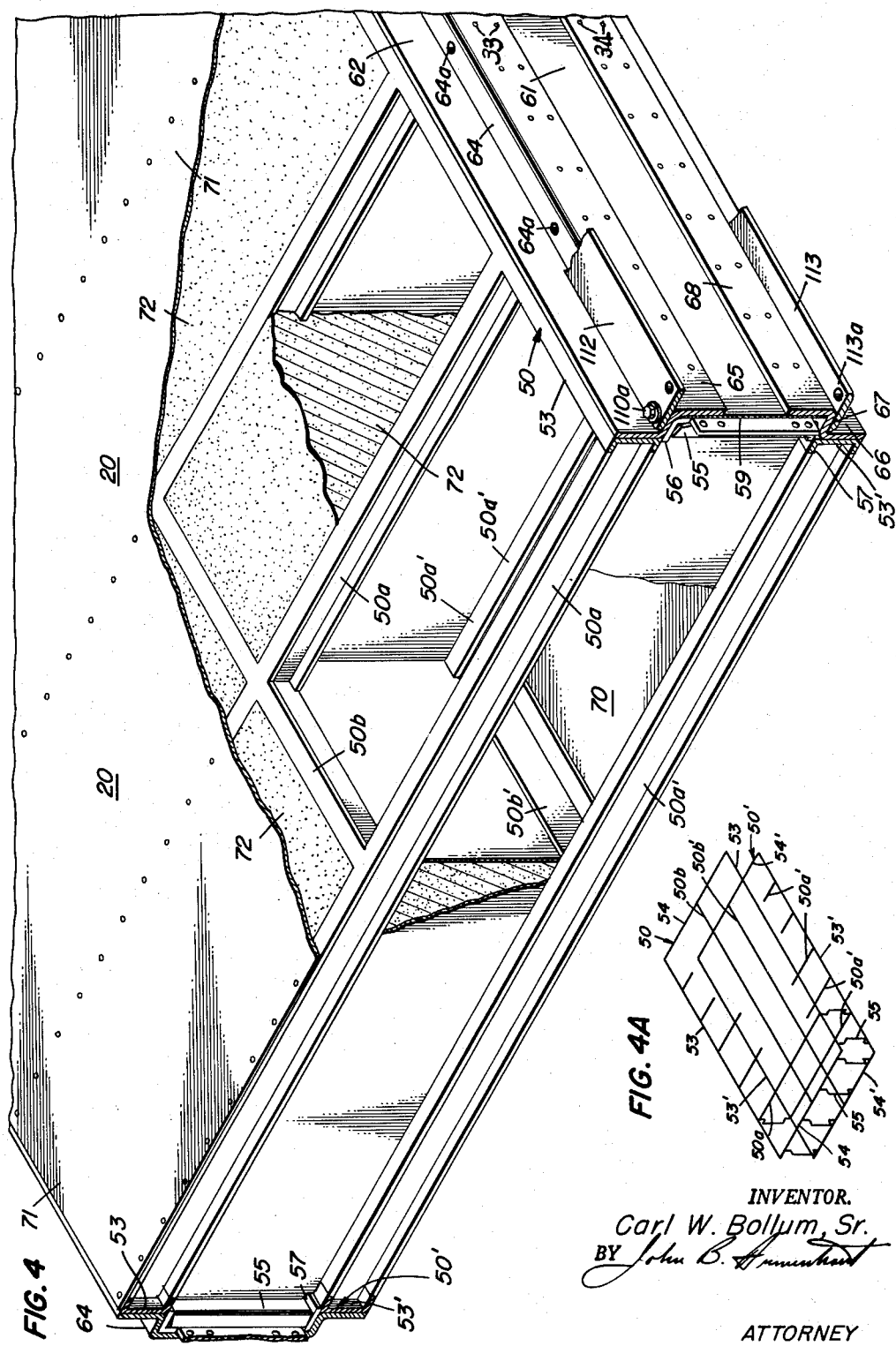

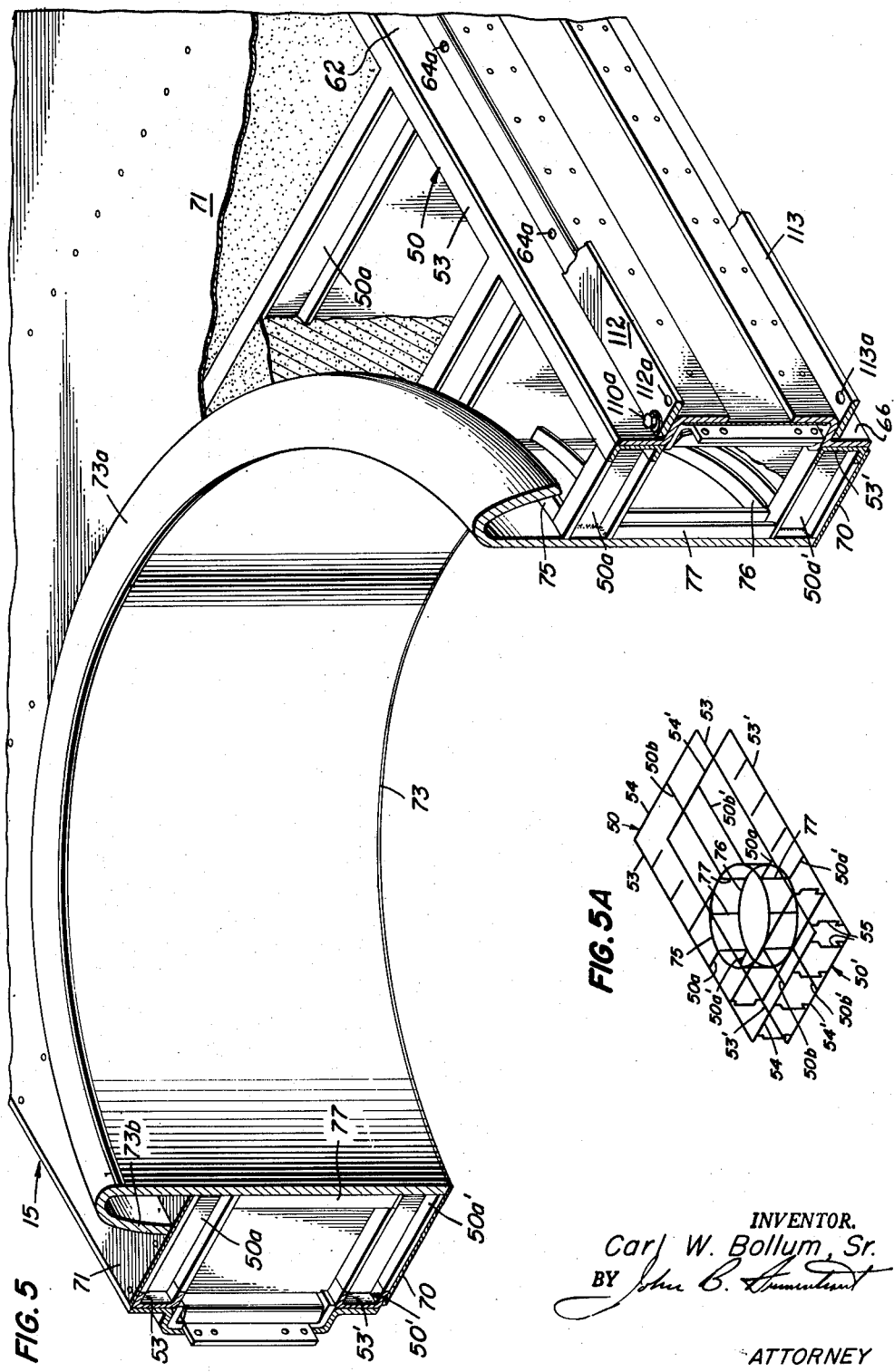

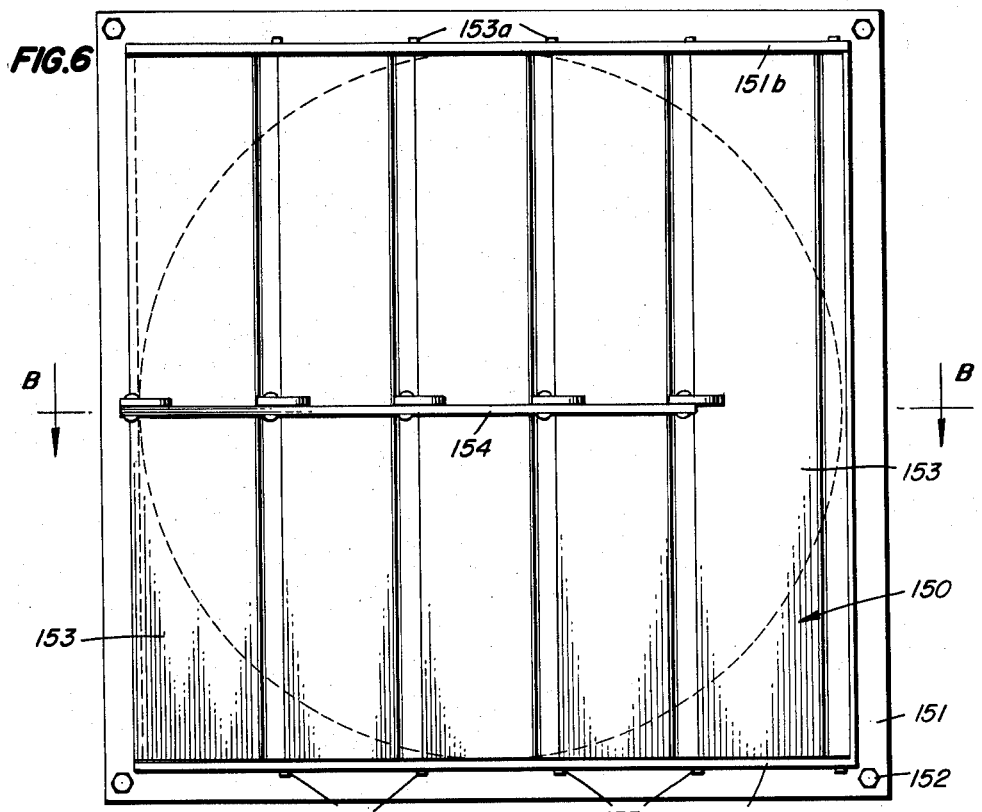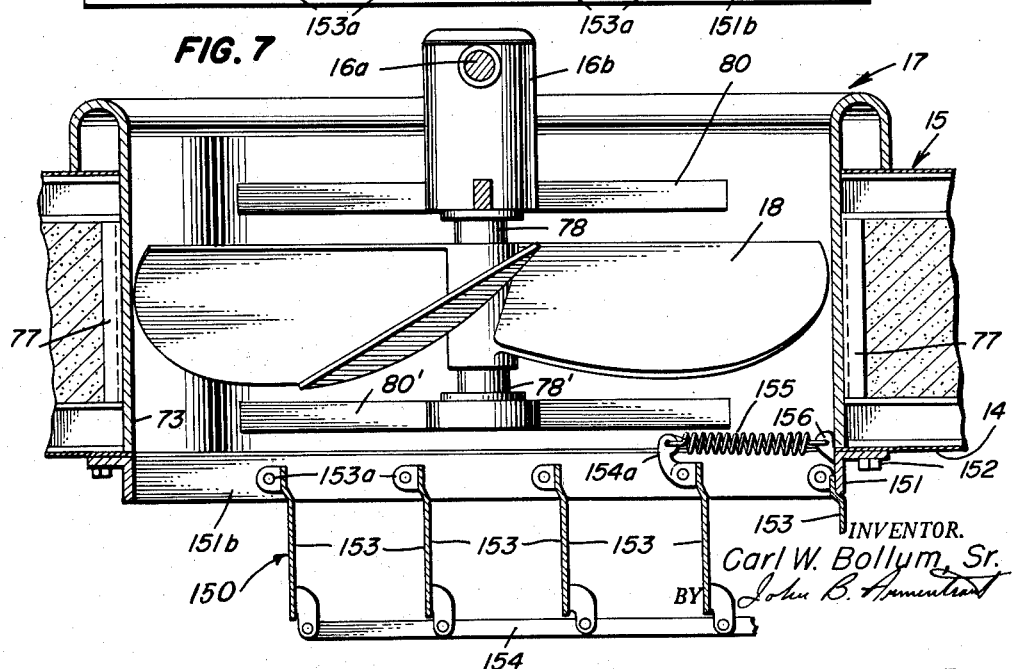

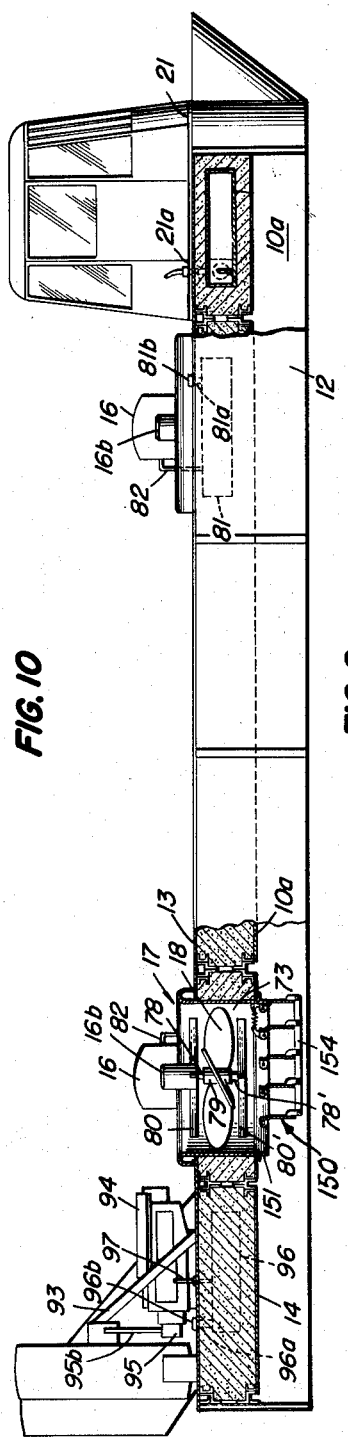

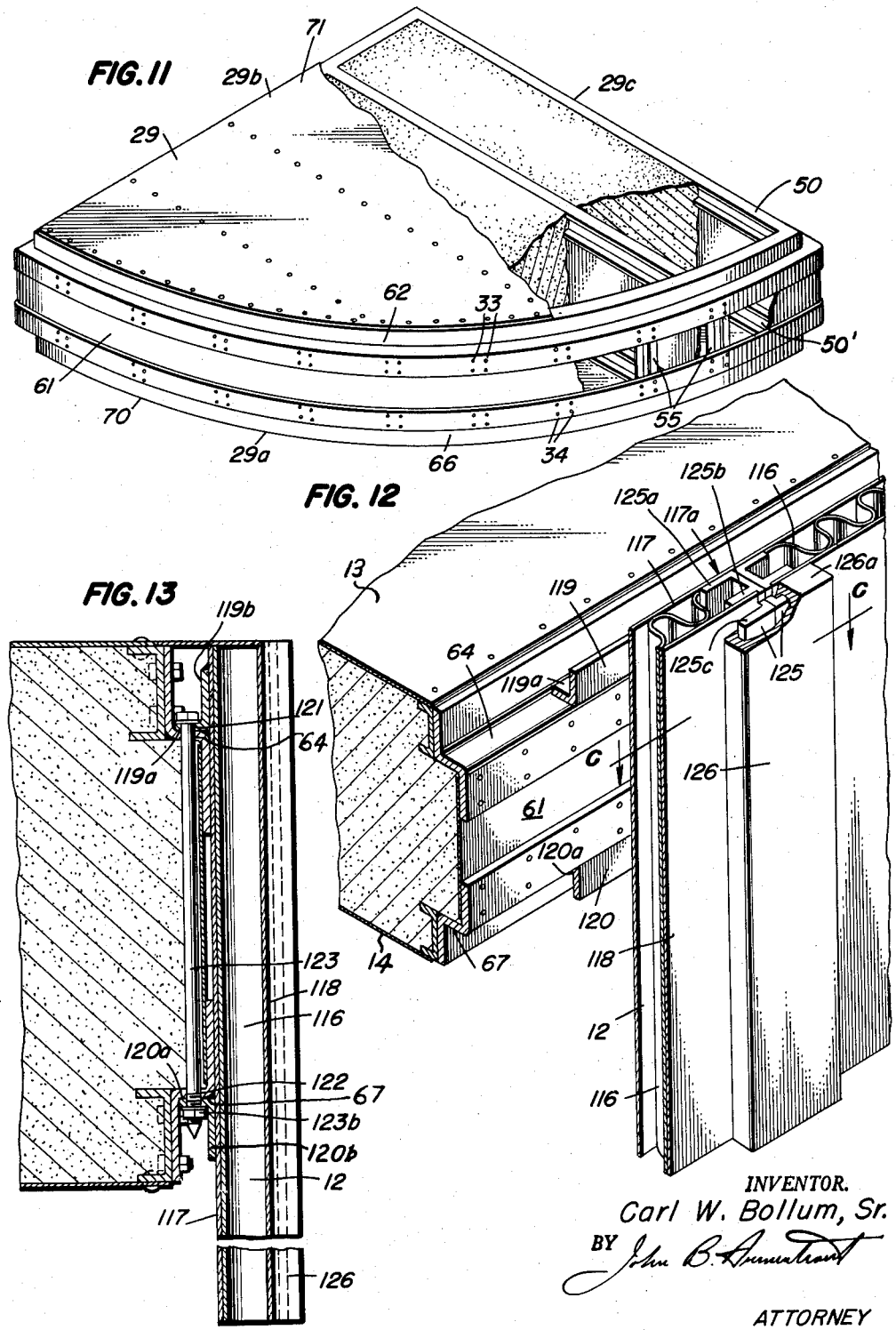

Oct. 8, 1963  C. W. BOLLUM, SR  3,106,260
EARTH-SKIMMING AIR VEHICLE WITH PRESSURE
RESPONSIVE VALVE MEANS
Filed Dec. 16, 1959  8 Sheets-Sheet 8
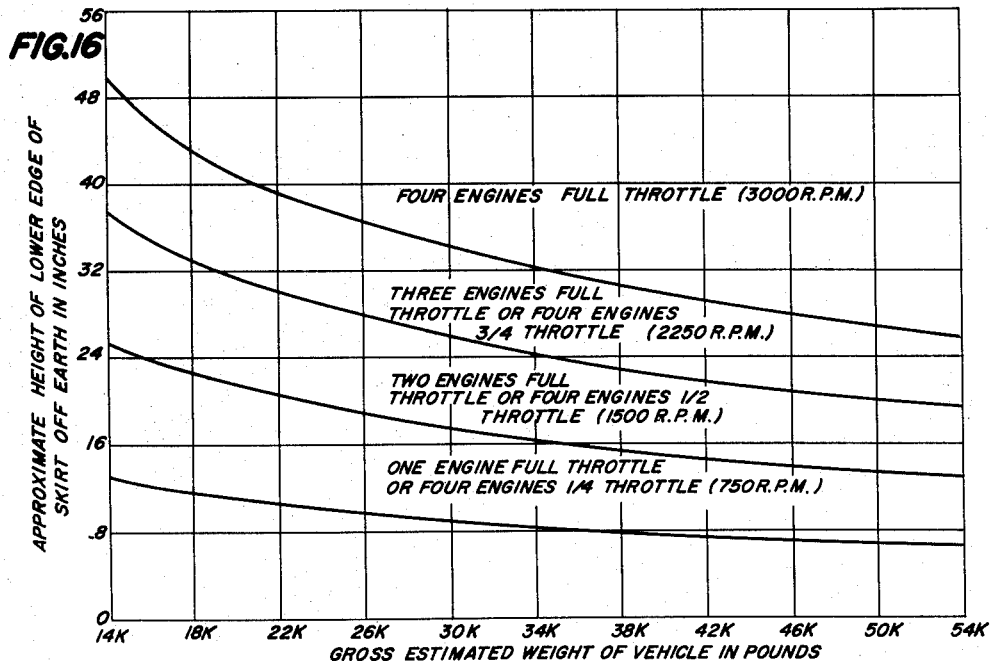
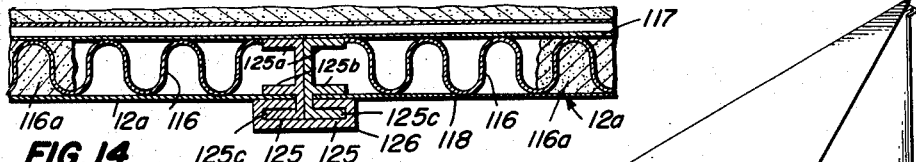
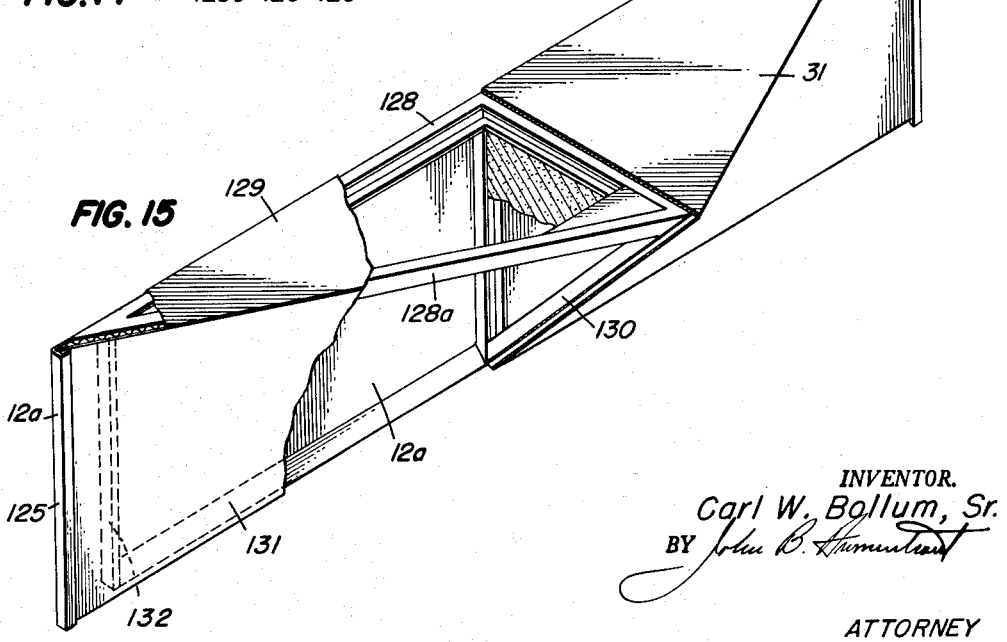
INVENTOR.
Carl W. Bollum, Sr.
BY
ATTORNEY United States Patent Office 3,106,260
Patented Oct. 8, 1963

3,106,260
EARTH-SKIMMING AIR VEHICLE WITH PRESSURE RESPONSIVE VALVE MEANS
Carl W. Bollum, Sr., Bethesda, Md., assignor, by mesne assignments, to Carwil Enterprises, Incorporated, Daytona Beach, Fla.
Filed Dec. 16, 1959, Ser. No. 859,909
9 Claims. (Cl. 180—7)

This invention relates to earth skimming air vehicles and more particularly to vehicles which are equipped with means on board for delivering gas to a compression chamber underneath the vehicle body for raising the vehicle to a low elevation above the surface of the earth and sustaining the vehicle in the air for travel.

An object of the present invention is the provision of a vehicle having a gas compression chamber underneath the body of the vehicle and power lift means mounted on board for delivering gas through a plurality of ducts and selectively through less than all of the ducts to the gas compression chamber to sustain the vehicle in the air, there being valve means in the gas ducts for opening the ducts when the power lift means is driven to move gas into the compression chamber through the ducts, and for opening the remaining of the ducts when the power lift means is operated to move gas into the compression chamber through less than all of the ducts, thus preventing escape of gas through any duct of the ducts which is not being used while the vehicle is operating.

Another object of this invention is the provision of a gas-sustained vehicle in which a plurality of power lift units and related gas ducts are provided for delivering gas to a compression chamber of the vehicle in adequate volume to develop a lifting pressure underneath the vehicle and sustain it in the air, the power lift units being separably operable so that all or less than all of the units may be put into operation to deliver the gas to the compression chamber for lifting and sustaining the craft, the vehicle having gas duct closure means whereby each gas duct allied with the power lift units is adapted to be automatically opened for delivering the gas into the compression chamber and automatically closed when not delivering gas into the chamber, so that the gas actually moved into the compression chamber is effective for its intended purpose.

Another object of this invention is that of providing an air lifted motor vehicle in which air pumps and corresponding air ducts are employed for supplying air from outside the vehicle to a compression chamber underneath the vehicle body, the air pumps being selectively driven to produce varying maximum lifting capacities of the vehicle depending upon the number of pumps operated, and in which the pumps may be safely brought into operation to add air to the compression chamber while valves for the air ducts effectively close any of the ducts which at any particular time of operation of the vehicle are not delivering pumped air to the compression chamber.

A further object of this invention is the provision of an air-sustained vehicle of the character indicated in which the air duct closure means is responsive to pressures developed by the air pump means against the closure means in favor of opening the valves and accordingly the ducts for air to be delivered to the compression chamber.

Another object of this invention is that of providing a vehicle of the character indicated in which the air duct closure means includes valves normally biased to closed position in the related air ducts and in which the valves are forced open by pressures developed by corresponding pumps when the pumps are operating in favor of delivering air to the compression chamber.

Another object is the provision of a vehicle of the character indicated in which the closure means in the ducts corresponding to the power lift units are operative by gas pressure for opening the related ducts and are responsive to spring bias to close the ducts in the absence of operation of the corresponding power lift units.

Other objects of the invention in part will be obvious and in part pointed out more fully hereinafter.

In the accompanying drawing, representing a vehicle embodying the present invention, and in which like reference characters denote like components throughout the several figures:

FIGURE 3 is a fragmentary vertical transverse sectional elevation of the vehicle platform along line A—A in FIGURE 2;

FIGURES 4 and 5 are perspective views respectively of one of the supplemental area-increasing sections of the platform and of one of the lift air inlet sections of the platform, the platform sections illustrated having portions of their coverings and fillings removed to expose inner structure;

Figure 1:
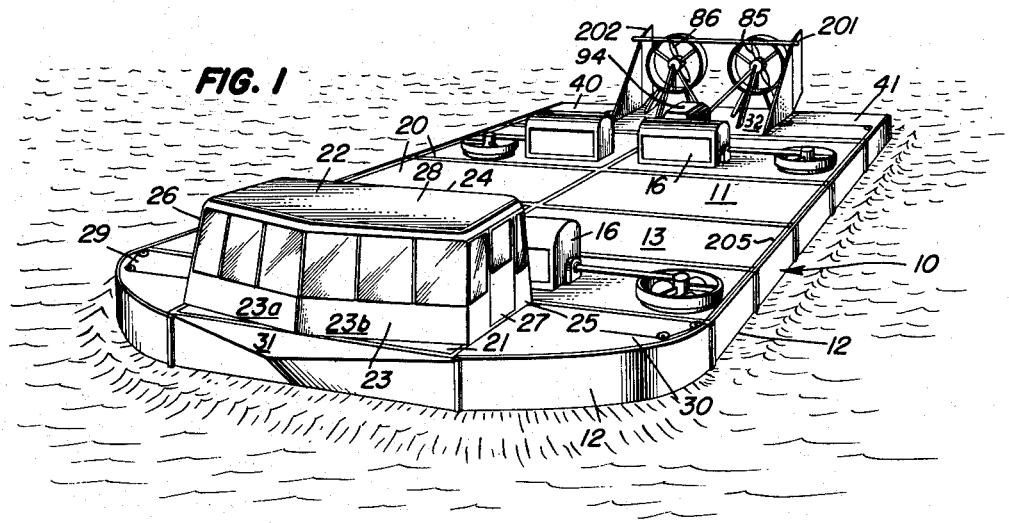
FIGURE 1 is a perspective view of a vehicle embodying my invention.
Figure 2:
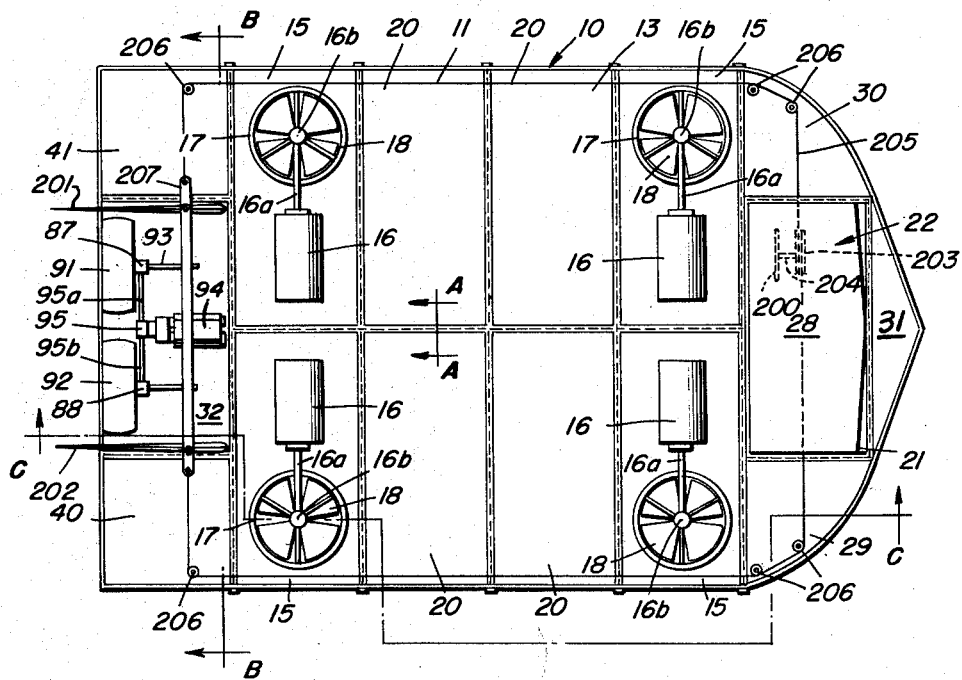
FIGURE 2 is a full plan view corresponding to FIGURE 1 and in addition, schematically represents a steering system for the vehicle.

FIGURES 4a and 5a respectively are schematic representations of framework of one of the supplemental area-increasing sections and of one of the lift air inlet sections of the platform;

FIGURE 6 is a plan detail view of an air shut-off valve of the vehicle platform and represents a closed condition of the valve;

FIGURE 7 is a view corresponding to FIGURE 6 and represents the valve in open position as viewed in transverse section along line B—B in the latter figure;

FIGURE 8 is a detail view in perspective of one of the posts employed in the platform framework;

FIGURE 9 is a transverse vertical sectional elevation along line B—B in FIGURE 2 and representing certain aft portions of the vehicle in full elevation;

FIGURE 10 is a longitudinal vertical elevation of vehicle and its platform, partially in section in accordance with line C—C in FIGURE 2;

FIGURE 11 is a perspective view of one of the forward corner sections of the vehicle platform with the covering and filling of the section partially removed to expose inner structure;

FIGURE 12 is a perspective fragmentary view of structure including several longitudinal sections of the skirt, and the adjacent peripheral edge of the vehicle platform;

FIGURE 13 is a transverse vertical elevation corresponding to FIGURE 12 and with an extension of the deck surface in place;

FIGURE 14 is a horizontal sectional view of the sections of the skirt on line C—C in FIGURE 12;

FIGURE 15 is a perspective partially broken away view of the bow section of the vehicle platform; and FIGURE 16 is a chart comparing certain conditions of operation of a particular vehicle constructed in accordance with the present invention.

In accordance with the practice of this invention, gas-sustained vehicles are provided having powerful vertical lift capabilities when carrying a load, such as a pilot with or without a crew and cargo. The body of the vehicle defines a gas compression chamber wherein the ceiling of the chamber is the underneath side of the body. Power lift means of the vehicle delivers gas to the compression chamber and maintains the gas in the chamber at a pressure which lifts the vehicle into the air and accordingly renders the vehicle gas pressure sustained. Also associated with the vehicle and carried by the same are propelling and steering means, by operation of which the craft can travel at low elevations above the surface from which it is raised by the air pressure and be guided. While the craft is in the air, the gas under the body continuously escapes between a gap formed by the lower edge of the vehicle body and the surface above which the craft is elevated, and the escaping gas is continuously replaced by additional gas being delivered to the compression chamber by the power lift means. The vehicle accordingly is levitated within a permissible range of low elevations, the elevations being controlled by the volume of gas sustained under the vehicle. When the craft is to be brought down, such as onto land or water, the gas delivered by the power lift means is diminished in effective quantity such as by throttling, and as the volume of gas under the vehicle diminishes, the craft settles down to earth.

Several air pumps, or other power lift units such as jet or rocket engines, turbo-compressors or other units in which the gas delivering properties are suitably controlled, for supplying the lifting gas to the compression chamber of the vehicle, importantly are allied with gas shut-off valves which may be operated to close off the compression chamber against flow back of gas through the gas inlet passages and may be operated to open those passages. When any of the air pumps or other power lift units is out of use, the related shut-off valve means is closed thus contributing greatly to efficiency of operation of the craft in the sense that escape of gas in the compression chamber through the gas inlet passage associated with any idle gas delivering unit is blocked. Benefit is derived by selecting and operating the particular number of power lift units needed for a particular power demand thus to lift the vehicle with the load aboard. There are of course occasions where the loads employed on the vehicle are relatively light and a reduced capacity for delivering lift gas to the compression chamber is permissible to sustain proper lift of the vehicle. Under these conditions, therefore, at least one of the units is put into operation to deliver the gas to the compression chamber and the unit or units not being used are associated with delivery passages which are effectively closed by the related gas shut-off valves to prevent the escape of gas through those passages from the compression chamber. Thus, consistent with lift capabilities demanded and afforded, the operational efficiency is very satisfactorily maintained while the gas being delivered for the lifting function serves that function based on the use of a given amount of equipment. A considerable latitude over power lift operation accordingly is made possible and the closure means allied with the lift units is available for being set to positions in the gas inlet passages consistent with power demands for sustaining the craft in the air.

Referring now to the embodiment of the present invention represented in the accompanying drawings, a hydro-air vehicle, designated generally by reference numeral 10, includes a body which comprises a platform 11 having a skirt 12 extending completely around the perimeter of the platform. A deck surface 13 of the platform is generally parallel to bottom surface 14 of the platform (see FIGURES 9 and 10) while the skirt extends substantially normal to both of these surfaces and for example projects below the bottom surface 14 a distance which is approximately equal to the thickness or height of the platform. Skirt 12 forms an air compression chamber 10a having the bottom surface 14 of the platform for a ceiling.

Platform 11 advantageously includes a plurality of interconnected prefabricated sections which when assembled contribute the top deck surface area 13 and bottom air pressure surface area 14 of the vehicle. These sections in the present embodiment include four generally rectangular lift air inlet platform sections 15 (see FIGURE 2) which have passages through the body from top side to bottom side for air to be fed into the compression chamber 10a. Further, the platform 11 includes four generally rectangular supplemental platform area-increasing sections 20 which illustratively have the same outside dimensions as the lift air inlet sections 15. Sections 20 are situated in pairs on opposite sides of the longitudinal center line of the vehicle and have their ends interconnected along that center line and along a line which is transverse to the center line. Two of the lift air inlet platform sections 15 are situated forward of the supplemental platform area-increasing sections 20 and have adjacent ends interconnected at the longitudinal center line of the craft and aft edges interconnected to forward edges of the adjacent area-increasing sections. The other two lift air inlet platform sections are disposed aft with respect to the sections 20 and have edges interconnected along the center line of the craft. Forward edges of the latter two lift air inlet platform sections are respectively connected to aft edges of the adjacent area-increasing sections 20.

Forward of the other sections just mentioned is a cabin platform section 21 of the vehicle, which section is rectangular in plan and conveniently is of the same outside dimensions as the sections 15 and 20. The cabin platform section has its aft edge connected to the forward edge of the adjacent lift air inlet platform sections and is disposed generally symmetrically with respect to those sections as to be substantially bisected by the longitudinal center line of the craft. Erected on the cabin platform section and over the platform area afforded by that section is a housing 22 which affords the cabin proper. The housing includes a front wall 23, a back wall 24, and opposite side walls 25 and 26. The front or forward wall is in two principal sections 23a and 23b which are angularly disposed with respect to each other, forming an apex at about the longitudinal center line of the craft and extending backward toward the opposite sides of the platform 11. The front wall has windows to afford forward view from inside the cabin. An access door 27 is provided in side wall 23a and if desired the side walls and rear walls may be glazed for view and light. A top deck or roof 28 is supported by the several walls to cover the cabin area.

Platform 11 also includes two forward corner sections 29 and 30 connected to the forward edges of the adjacent lift air inlet sections 15 and having edges interconnected to the opposite side edges of the cabin platform section. The corner sections are right hand and left hand counterparts and have like dimensions so as to produce a symmetrical platform 11. Corner sections 29 and 30 are generally triangular in plan and are of a size which establishes outer peripheral edge continuity of the platform from the outer peripheral edge of the adjacent lift air inlet platform section to the forward edge of the cabin section.

At the aft end of the vehicle is a rectangular propulsion platform section 32 having outside dimensions which conveniently are the same as the outside dimensions of the lift air inlet platform sections 15, the supplemental platform area-increasing sections 20, and the cabin platform section 21. The propulsion section has its forward edge abutting the aft edges of the adjacent lift air inlet platform sections and is interconnected with these sections in a position where the longitudinal center line of the craft substantially bisects the propulsion section.

The platform sections 40 and 41 form portions of the platform 11 at the aft end of the vehicle. These corner sections are as wide and half as long as the propulsion platform section 32 and have forward edges connected to corresponding aft edges of the adjacent lift air inlet platform sections 15 and inside edges connected to opposite end edges of the propulsion platform section 32.

In all, the platform 11 therefore is generally rectangular in plan. As will be explained more fully hereinafter, edges of the various sections which occur outside the platform on the perimeter of the platform conveniently allow longitudinal sections of the skirt 12 to be attached to the platform. Sometimes, certain of the platform sections have their corresponding lengths of the skirt 12 prefabricated and attached to a given platform section prior to the time that the platform of the vehicle is assembled from the various sections employed. Thus, for example, all of the corner sections 29, 30, 40, and 41 of the platform are sometimes prefabricated as independent sections which already includes lengths of the skirt along the sides or edges of those sections which are to occur outside the platform 11. Then after assembling all of the sections of the platform in their proper relations, remaining lengths of the skirt are added by attachment to the outside edges of the lift air inlet sections 15, supplemental area-increasing platform sections 20, cabin section 21, and propulsion section 32.

Each of the supplemental platform area-increasing sections 20 (see FIGURES 3, 4, and 4a) is characterized by having rectangular top and bottom frame portions 50 and 50' of like outside dimensions. Each of the top frame portions 50 includes a pair of spaced parallel longitudinal channel members 53 and an opposite pair of channel members 54 extending transversely to the longitudinal members and joined at the ends to the ends of those members. The bottom frame portion likewise includes a pair of spaced parallel longitudinal channel members 53' joined at the ends by the transverse channel members 54'. The flanges of the channel members are generally horizontal and are directed toward the inside of the platform section. Supporting the bottom flanges of the channel members of the upper frame portion from the top flanges of the channel member of the bottom frame portion are a plurality of vertical posts 55 laterally spaced from each other at suitable distances around the perimeter of the platform section. These posts (see FIGURE 8) includes angle members 56 and 57 at their opposite ends, which angle members have horizontal legs 56a and 57a bearing against the flanges of the corresponding channel members of the top and bottom frame portions while vertical legs 56b and 57b of the angle members are attached as by welding respectively to top and bottom ends of strut plates 58 and 59 of the post which lie along opposite sides of the edges of the vertical legs of the angle members. The outside surfaces of the strut plates and vertical legs of the angle members lie in a vertical plane which is substantially parallel to a plane which includes the vertical webs of the corresponding longitudinal or transverse channel members of the upper and lower rectangular frame portions of the platform section, depending upon whether the posts are situated along transverse channel members 54 and 54' or longitudinal channel members 53 and 53' of those frame portions. Each of the posts also includes a vertical channel member 60 extending the whole distance between the upper and lower horizontal legs 56a and 57a of the angle members of the post, and the vertical channel member opens toward the outside of the platform section and affords legs 60a and 60b which are welded to the inside surfaces of the strut plates 58 and 59. Accordingly, the vertical channel member closes off the space that is inside the platform section 20 from the outside of the section. A strip of thin gauge sheet metal 61 covers a space existing between the vertical legs 56b and 57b of the angle members of each of the posts 55 in the platform section and extends the full perimeter of the platform section. A top rail 62 (see FIGURES 3 and 4) made of heavy gauge sheet metal encloses the perimeter of the rectangular top frame portion 50 of the platform section and is secured to the webs of the channel members 53 and 54 of the top frame portion such as by bolts 63 at suitable intervals around the perimeter. The top rail has a reverse angle extension which affords a top ledge 64 and a vertical rim 65 both extending the full perimeter of the platform section. Rim 65 is riveted at 33 to the posts 55. The ledge 64 of the top rail conveniently rests on the upper surface of the horizontal leg of angle member 56a in each of the posts. Similarly, the platform section 20 includes a bottom rail 66 formed of heavy gauge sheet metal and the bottom rail has a reverse angle extension forming a bottom ledge 67 resting against the under surface of leg 57a in each of the vertical posts in the assembly and affording a lower rim 68 riveted at 34 to each of the posts 55. Upper and lower rims 65 and 68 overlap the thin gauge metal cover strip 61 continuously around the perimeter of the platform section and the riveting of the rims to the posts also accomplishes affixation of the cover strip thus closing off the interior of the platform section and completing the peripheral side wall of the section 20.

The lower rectangular frame portion 50' of the platform section is covered at the bottom side of the section by metal sheet 70 of suitable gauge which is riveted at intervals or otherwise suitably affixed to the lower legs of the longitudinal and transverse channel members of the lower rectangular frame. For additional support and strengthening of the platform section, a set of spaced parallel channel beams 50a' (see FIGURES 4 and 4a) are conveniently introduced and connected to opposite channel members 53' of the lower rectangular frame portion. Struts 50b' sometimes are added between beams 50a' and running the distance between the other pair of channel members 54' of the lower rectangular frame portion 50'. Bottom cover sheet 70 conveniently is further secured as by riveting to the inner frame portions 50a' and 50b' of the lower rectangular frame portion 50'.

The deck surface of platform section 20 conveniently is provided by a sheet metal covering 71 affixed to the top rectangular frame portion 50 of the second. The sheet metal deck usually is made of a somewhat heavier gauge material than is the covering 70 on the under side of the platform section especially when direct deck use is to be encountered. The deck sheet may further be supported by a series of spaced channel members 50a extending between and interconnected with corresponding opposite outside channel members 53 of the top rectangular portion of the frame. These inner channel members of the frame may have lateral struts 50b extending between themselves and the other pair of opposite outside members 54 of the top rectangular portion of the frame. The deck covering usually is affixed to the inside channel members and struts referred to. Prior to closing off the inside of the platform section 20, such as by securing the deck covering 71 in place, a very substantial advantage is had by filling the available space inside the section with a substance which will assure buoyancy of the section in the water and in effect substantially eliminate space which otherwise could through leaks receive appreciable amounts of water in the platform section, with the water unduly adding to the vehicle load when the vehicle is airborne or is to rise from the earth in accordance with the available air lift capabilities. A preferred manner of assuring buoyancy and water repellence and the retention of those properties resides in filling the available space of the platform section with a closed cell, lightweight resin foam 72, such as "Styrofoam," which preserves its closed cellular watertight condition even in the presence of water and accordingly will displace an equal volume of water. This filling often is introduced in the majority in cake or bat form roughly to fill the available space in the platform section. Rectangular sheets or cakes of the foam illustratively are placed side by side in the space for this purpose while any remaining spaces between the foam cakes introduced and the inside surfaces of the platform section are filled by foaming further amounts of the resin in situ which for example bonds the cakes to the inside surfaces of the platform section walls.

The cabin platform section 21, propulsion section 32, and each of the lift air inlet platform sections 15 of the vehicle also include top and bottom rectangular frame portions 50 and 50′, vertical posts 55 between these frame portions, and structure including a thin gauge metal strip 61 and top and bottom rails 62 and 66 with reverse angle extensions riveted to the posts through the sheet metal strip. This structure has already been described with reference to the supplement area-increasing platform sections 20 and accordingly will not be brought forth again in full detail. The inside framework of each of the lift air inlet platform sections 15 (see FIGURES 5 and 5a) is modified to include top and bottom annular plates 75 and 76 in the top and bottom inner framework of the section. A cylindrical air duct 73 of very considerable diameter extends through the body of platform section 15 and through the openings afforded by the annular plates 75 and 76 in the top and bottom inner framework. Struts 77 are situated immediately against the duct wall surface that is exposed to the interior of the platform section. The struts 77 and annular plates 75 and 76 are suitably secured to each other at the upper and lower ends of the struts and if desired the wall of the duct is connected to the struts, such as by riveting. For additional support and strengthening of the platform section, a set of parallel channel beams 50a are conveniently introduced and connected to opposite channel members 53 of the upper rectangular frame portion 50. Certain of these channel members 50a are interrupted along their lengths and are suitably connected to the top annular plate 75. Lateral struts 50b conveniently are added between beams 50a and extending the distance between the other pair of channel members 54 forming the upper rectangular frame member 50. Some of these struts 50b (see FIGURE 5a) have their ends connected to the top annular plate 75. Likewise, lower rectangular frame portion 50′ of the platform section 15 includes inner channel members 50a′ and lateral struts 50b′ assembled therewith with certain of the struts being discontinued at the duct 73 and connected to the annular plate 76. A bottom cover sheet 70 extends over the bottom frame structure of the platform section and is secured to that structure as by riveting and also a top cover sheet 71 extends over the top framework of the section and is secured in place as by riveting to the allied frame structure. The upper end of the cylindrical duct 73 is in the form of an arched outwardly extending rim 73a and the rim includes an outer leg 73b. Leg 73b conveniently abuts cover sheet 71 at the outer end of the leg while the lower end of the cylindrical duct 73 abuts the inner surface of the bottom cover sheet 70 and is welded to the latter sheet.

On the under side 14 of air inlet section 15 (see FIGURES 6 and 7) and disposed across the end of duct 73 is an anti-backflow closure and bias means including an air shut-off valve 150 having a rectangular frame 151 of angular cross section. The valve frame is secured in place on section 15 by machine screws 152. Bridging the frame of the valve are a plurality of parallel spaced rectangular slats 153 having stub shafts 153a on their opposite ends, the latter ends extending into openings in the vertical legs 151b of the frame and accordingly being journaled in the frame. A transverse bar 154 pivotally connected to like edges of the slats 153 is biased by spring 155 of the anti-backflow closure and bias means in favor of moving all of the slats in unison on their pivots until the slats overlap each other widthwise to close the opening formed by the rectangular frame and accordingly close off duct 73 at the lower end of the duct. The duct 73 thus is substantially blocked against the escape of air from the compression chamber toward the top side of the platform 11. Biasing spring 155 is connected to arm 154a on one of the slats 153, adjacent to the pivoted end of that slat, and thus can exert its bias upon the transverse bar of the closure valve assembly. The other end of the spring is affixed to frame 151 of the valve 150 by a lug 156. The spring has sufficient tension to maintain the slats 153 in the closing position with respect to duct 73. The several slats of the valve are rotatable against the bias of spring 155 on their respective pivots in the frame 151 to a position (see FIGURE 7) where they open the duct 73 for air to enter the compression chamber 10a from above the platform 11.

An air lift pump 17 (see especially FIGURES 2 and 10) includes as a pressurizing means a four blade rotor 18 with the blades pitched in favor of delivering air from the deck side of the lift air inlet platform section 15 to the bottom or air pressure lift side of the section, and the rotor or impeller has its shaft 79 journaled in top and bottom bearings 78 and 78′ which are supported by radial arms 80 and 80′ extending to the wall of the duct 73 and connected through the wall to the vertical struts 77. A right angle gear box 16b mounted on the upper journal frame of the pump has its output end connected to the pump shaft 79 and is connected at the input end to a drive motor 16 such as of the internal combustion engine type by means of a substantially horizontal drive shaft 16a as represented in FIGURE 2. Motor 16 has a base, preferably resting on the deck surface of the platform section 15 itself, and suitably connected to the underlying top members of the frame of the section. In the space available inside lift air inlet platform section 15 advantageously is a fuel tank 81 (see FIGURE 10) suitably mounted to the inner framework of the section and having a fill tube 81a extending through the deck sheet 71 and covered by means of a screw cap 81b. Further, the fuel tank and motor 16 have an interconnecting fuel supply line 82 so that fuel in the tank is available to the fuel pump of the motor for the motor to operate. All remaining space inside lift air inlet platform section 15 preferably is filled with foam resin or the like for reasons previously explained with reference to the supplemental area-increasing platform sections 20.

Air lift pump 17 is so disposed relative to the air shut-off valve 150 as to produce a pressure differential in the duct 73 across the slats 153 of the valve, causing the valve to open against the bias of spring 155 when the rotor of the pump is being driven by means of motor 16 in a direction favoring the input of ambient air above the vehicle platform 11 through the duct into the compression chamber 10a. When pump 17 is stopped the bias of spring 155 prevails in favor of returning the slats to their overlapping positions with respect to each other thus for the duct to be closed against back flow of air from the compression chamber. The other air inlet sections 15 of the vehicle platform also have pumps 17 and pump driving motors 16 allied with air duct shut-off valves 150 and since the structure of each of these platform sections illustratively is the same as the sections 15 already described herein, the description of each of the sections need not be repeated.

Propulsion section 32 of the platform 11 of the vehicle conveniently is structurally the same as each of the supplemental area-increasing sections 20 of the platform except that (see FIGURE 9) the propulsion section is somewhat modified to accommodate propulsion equipment of the vehicle such as thrust-producing propellers 85 and 86 having substantially horizontal shafts journaled as output shafts of L-gear boxes 87 and 88 respectively. The gear boxes are mounted on spider frames 89 and 90 which are forward of the propellers and attached to annular shroud frames 91 and 92 surrounding the respective propellers. The shroud frames of the propellers are suitably connected to inner framework of the propulsion section 31 and braces generally represented at 93 also connect the gear boxes to the same platform section. The propellers have a driving motor 94 suitably anchored to the platform 11, preferably to the framework of the propulsion section itself. This motor has its drive shaft situated in the fore and aft direction of the vehicle and the drive shaft is operative through a T-gear box 95 equipped with output shafts 95a and 95b (see FIGURE 2) which are drivingly connected to the input sides of the L-gear boxes 87 and 88. The gearing arrangement employed may for example be of the type to cause both propellers to rotate simultaneously in like directions or of the type which causes the propellers to operate simultaneously in opposed directions. A fuel tank 96 (see FIGURE 10) conveniently occupies part of the space within the body of the propulsion section and is equipped with a fill tube 96a having a closure cap 96b above the surface of the deck. A fuel line 97 interconnects the fuel tank and the motor so that the fuel pump of the motor can supply fuel for operation of the vehicle. The remaining volume of the interior of the propulsion section advantageously is filled with foam resin to promote buoyancy of the platform 11 on water.

It has been previously explained that the cabin section 21 of the platform supports walls having a door and windows, and the cabin area is covered by a roof. The cabin itself may be of prefabricated type and erected on the cabin platform section such as after the entire platform has been assembled. The cabin platform section is adapted to accommodate the erection of the cabin walls such as by having suitable cabin wall attachment plates 21a (see FIGURE 10) covering the deck surface of the section and suitably connected to the framework of the section through the deck. Structural details of the cabin platform section are otherwise conveniently the same as that of one of the supplemental area-increasing sections 20. The space inside the cabin platform section advantageously is filled with foam resin to assure continued buoyance of the platform when the vehicle is afloat on water.

An understanding of the structure of corner sections 29 and 30 of the platform will be made clear through describing section 29, since the sections are righthand and lefthand counterparts. Referring to corner section 29 and more particularly to FIGURE 11, forward side 29a is a curved wall and the other two sides 29b and 29c are planar and perpendicular to each other. The section conveniently includes top and bottom triangular frame portions 50 and 50'. The top and bottom triangular frame portions are made up of channel members having their webs vertical and the legs extending toward the inside of the corner section. Suitable top and bottom inner frame elements conveniently are added to the triangular frame components to contribute strength. The side frame and walls of the generally triangular corner section 29, other than contributing to the generally triangular configuration of the section, are like the side frame and walls of rectangular platform section 20 or of any of the other rectangular sections of the platform. Vertical posts 55 are interposed between the top and bottom triangular frame portions 50 and 51 and are laterally spaced from each other, receiving on the outside a cover strip of thin gauge sheet metal 61 which is overlapped by reverse angle extensions of top and bottom rail members 62 and 66, the latter being fastened to the webs of the channel members of the top and bottom triangular frame portions. Rivets 33 and 34 secure the reverse angle extensions and thin gauge metal strip to the posts. Bottom and deck sheets 70 and 71 are carried suitably attached to the lower and upper frame portions of the corner section. As for the aft corner sections 40 and 41 of the platform of the vehicle, these conveniently are rectangular and have framework and walls which are the same as that described with reference to the supplemental area-increasing sections 20 of the platform. This structure therefore includes top and bottom rectangular frame portions, posts, top and bottom rail members with reverse angle extensions covering a thin gauge sheet metal strip. Bottom and deck sheets 70 and 71 are secured to the rectangular frame portions as already described with reference to others of the sections of the platform. Corner sections 29, 30, 40, and 41 advantageously are buoyant on water and for example are filled with foam resin for buoyancy and to exclude water from the insides of the sections.

The various sections of the platform 11 heretofore described may be readily assembled to produce a rigid platform structure and in this regard attention now is directed to the upper and lower ledges 64 and 67 (see for example FIGURE 3) amounting to peripheral extensions of the main top and bottom surface areas of the individual sections. These ledges have a series of apertures 64a and 67a along their lengths and the apertures are vertically aligned with apertures 60c and 60c' in the post ends through the space afforded in each of the posts 55 of the frame structure. These spaces in the posts occur by reason of the vertical channel components of the posts which set apart the hollow post space such as from the foam resin filling of the platform section when the filling is introduced to assure buoyance. Accordingly, long bolts 110 have their shanks readily accommodated by the apertures in the ledges and post ends. The head ends 110a of the bolts illustratively correspond to the top side of the platform while the lower ends 110b of the bolts threadedly receive corresponding nuts 111. In conjunction with the bolts, top and bottom connecting plates 112 and 113 are employed to bear against the top and bottom ledges of the platform sections for interconnecting the sections. These connecting plates each have two spaced parallel series of holes 112a and 113a for the bolts 110, and the holes in the series correspond to the apertures 64a and 67a in the ledges and the spaces available in the posts of adjacent platform sections. By first connecting the top and bottom plates 112 and 113 to the top and bottom ledges 64 and 67 of a given one of the platform sections through the use of bolts 110 and corresponding nuts 111, the top and bottom plates then form projections between which the top and bottom ledges of the adjacent platform section are received. In assembling the two platform sections, therefore, the side walls of the sections are brought into abutment, and the second section of the group then is fastened in place by the insertion of bolts 110 through the remaining other series of apertures in the top and bottom connecting plates 112 and 113 with the bolts extending through the spaces afforded by the corresponding posts 55 of the second section. Nuts 111 associated with the lower ends of bolts complete the connection. It will be noted that in the present embodiment spaces or troughs 114 occur between the deck levels of several sections of the platform by reason of the ledge detail. By covering these troughs with deck strips 115 and fastening these strips in place to the upper frame portions of the platform sections, a platform 11 having a continuous deck including top sheets 71 of the sections and strips 115 is achieved. The trough space often is utilized for housing pipes, cables, control wires or the like, such as for remotely controlling steering and operation of the drive means employed for the lift air pumps and the propulsion propellers. Inverted troughs 114a incidentally occur in the present embodiment on the underneath sides of the adjacent platform sections by reason of the bottom ledges of the platform sections. However, it is not important that the inverted troughs be covered. The main ceiling area of the compression chamber 10a includes the bottom cover sheets 70 of the platform sections in the assembly, and the inverted troughs between the sections also contribute air pressure lift area for the ceiling.

Skirt 12 of the platform 11 advantageously is a laminated sheet metal structure (see FIGURE 14) in which an intermediate layer 116 of the skirt is of corrugated sheet metal having ribs and the ribs extend vertically in the position of use of the skirt on the vehicle. This corrugated intermediate layer is between two outside sheet metal layers 117 and 118 suitably bonded to the intermediate layer at the crests of the ribs of the intermediate layer. Sometimes the laminated body of the skirt is constructed having the intermediate layer embedded in a resin 116a which fills the spaces between that layer and the outer layers 117 and 118 and bonds the outer layers in place in the composite. On one face 117a of the composite sheet and generally parallel to the top edge of that sheet are spaced upper and lower skirt connector components 119 and 120 (see FIGURE 12) such as in the form of upper and lower rail members extending along the length of the composite sheet. The upper and lower rail members conveniently are angle members extending along the length of the composite sheet and thus have legs 119a and 120a perpendicular to the surface of the composite sheet and legs 119b and 120b (see FIGURE 13) resting against the surface of the sheet and connected to the laminated body as by rivets (not shown) at suitable intervals. The outwardly projecting legs 119a and 120a of the angle members are spaced apart a distance which is just slightly more than the distance of spacing of the upper and lower ledges 64 and 67 heretofore described with reference to the platform sections of the vehicle. There are apertures 121 and 122 through the legs 119a and 120a of the angle members and the apertures are in vertical alignment and occur at intervals which are equivalent to the spacing of bolt holes 64a and 67a in the upper and lower ledges of the platform sections. The skirt 12 accordingly is secured to the side walls of the platform sections that are exposed at the periphery of the platform after the platform sections have been assembled. Connection of the skirt is accomplished by using bolts 123 (see FIGURE 13) which are inserted through the apertures in legs 119 and 120 of the skirt and in ledges 64 and 67 of the side walls of the platform sections after applying the skirt so that the legs 119 and 120 of the angle members receive the ledges 64 and 67 in a tongue and groove fashion. Captive nuts 123b on the underneath side of the angle member leg 120a receive threaded shank ends of the bolts 123 to attach the skirt in position on the edge of the platform.

Skirt 12 preferably is prefabricated in sections 12a in terms of total length of the skirt. These lengths conveniently are made equivalent to the lengths of the platform sections which directly contribute to periphery of the platform. The ends of the skirt lengths or sections which are to be vertical in the assembly illustratively are built to include E-shaped edge forming components 125 (see FIGURE 12) and each edge forming component has two of its legs 125a and 125b inserted between the outside sheet members 117 and 118 of the laminate and suitably secured to these sheets such as by welding. An outermost leg 125c of the E-member is outside the sheet 118 and is generally parallel to the outside surface of the section 12a. By installing the sections 12a of the skirt so constructed, the E-members at the edges of the skirt lengths are brought into back to back abutment and the outside legs 125c of the adjoining lengths of the skirt accommodate a C-rib 126 which for example is moved down vertically while working from the deck of the platform so as to engage the outer legs of the E-members and hold the adjoining lengths 12a of the skirt together along their full heights. A suitable stop 126a may be provided on the upper end of the C-member to arrest vertical movement when the member has been slid in place along the full height of the skirt. The skirt assembling operations described may proceed all the way around the perimeter of the platform until the skirt 12 has been affixed to the outside wall of the platform.

A bow section 31 (see FIGURE 15) conveniently is provided to lend contour to the front of the vehicle 10. This bow section in the present embodiment is derived through prefabricating one of the lengths 12a of the vehicle skirt to form the section. Thus, a skirt length 12a, including E-shaped vertical edge forming components 125, supports adjacent to the top edge a triangular top frame 128 carrying a cover plate 129 that provides an extension of the deck of the vehicle platform. The forward members 128a of the triangular top frame of the bow section come to a forward apex which is substantially on the longitudinal center line of the vehicle. Secured to these forward members at the apex is an inclined strut 130 having its lower end suitably connected to the skirt section 12a near the lower edge of the section centrally along the length of the section. Bow plates 131 are connected to the marginal portions of the opposite ends of the skirt section. Further, the bow plates have edges joined to the inclined strut 130 of the bow section 31 and upper edges of the plates 131 are joined to members 128a of the triangular frame 128. Suitable bracing members 132 may be added to the aft face of the bow skirt section 12a for reinforcement if desired.

When the bow section 31 is assembled to the forward edge of the cabin section 21, such as in the manner of assembling the other skirt sections to the platform, a bow is had which involves the use of a skirt section extending directly along the forward edge of the cabin platform section. C-rib connectors 126 conveniently are utilized to engage the E-shaped edge forming components of the skirt length 12a in the bow section to the adjacent E-shaped edge forming components of the skirt lengths corresponding to the platform corner sections 29 and 30.

The air lift pump driving motors 16 and propeller motor 94 sometimes are installed on appropriate sections of the platform 11 of the vehicle before the platform sections are actually assembled into the platform, and in other instances installation is delayed until after the platform exists as a unit. When installed, the air lift pump motors 16 preferably are supported directly on the corresponding air inlet propulsion sections 15 and propeller motor 94 on the propulsion platform section 32, although other sections of the platform sometimes are availed upon for supporting these same motors. The air lift pumps 17, air shut-off valves 150, propellers 85 and 86, along with their supporting frameworks, are installed on the corresponding air inlet and propulsion sections before or after the platform is assembled, and like remarks apply to the walls of the cabin on the cabin platform section.

Thus it will be seen that through assembling various platform sections and adding the skirt, a platform vehicle is easily obtained which is characterized on the underneath side by having an air compression chamber 10a. The ceiling of the compression chamber is formed by the under surfaces of the platform sections and the side wall of the chamber is formed by the skirt. The lower edge of the skirt preferably is a uniform distance below the ceiling of the compression chamber of the vehicle.

In operation, the lift motors 16 of the vehicle are started and these motors drive the air pumps 17 in favor of having the pumps deliver air through their respective air ducts 73 down into the compression chamber 10a. With the pumps in operation, air pressure is developed on the slats of the air valves 150 in the ducts and the valves open the ducts against the bias of the related springs 155 and air from the pumps accordingly passes down into the compression chamber. As the pressure of the air builds up in the compression chamber, a unit pressure is reached and applied against the ceiling of the compression chamber which is sufficient to cause the vehicle to rise from the surface of the earth. The lifting pressure of the air in pounds per square inch then exceeds the opposing gross weight pressure of the vehicle in pounds per square inch. The vehicle rises vertically until an equilibrium between these pressures is established. At equilibrium height of the vehicle 10, the air volume pumped into the compression chamber and the air volume which escapes from under the lower edges of the skirt 12 are equal. The height of the lower edge of the skirt above the surface from which the vehicle has risen is an earth skimming height, in certain embodiments ranging up to several feet and is substantially a linear function of air pumping capability of the vehicle and the load encountered. In effect, an air cushion is formed under the vehicle platform and as this air which is under pressure leaks out below the skirt, the air is replaced in the compression chamber by the pumps, and the platform and the remainder of the vehicle accordingly are stably airborne. Once this air bearing or cushion has been formed, it takes very little energy to move the vehicle over the surface of the earth. This movement is readily accomplished by means of the propulsion units. With the propulsion motor 94 operating and driving the propellers 85 and 86 which move the vehicle 10 forward under the substantially equal thrusts which these propellers produce, the pilot of the vehicle may accomplish steered movement of the craft such as by rudders 201 and 202 at the aft end of the platform and which are susceptible to remote control from the cabin. A steering wheel 200 in the cabin rotates with a pulley 203 on its shaft 204 and over this pulley a steering cable 205 is wound several times for frictional engagement. The cable is guided over suitable guide pulleys 206 on the platform and the ends of the cable are connected to the opposite ends of a transverse steering bar 207 pivoted to the respective rudders behind the main pivots of the rudders. The steering bar 207 accordingly links the rudders for conjoint rotation in parallelism to each other about their main pivots. The pilot therefore may steer the vehicle from the cabin by turning the steering wheel, and thus setting the rudders to desired course position with the aid of the steering cable and the associated steering bar. Other suitable steering means of course may be introduced if desired, such as through installing longitudinal thrust propellers of variable pitch on the propulsion section of the platform and introducing a pitch differential by suitable means for steering.

In way of specific illustration, a vehicle in accordance with the present invention and equipped with four air pumps having bladed impellers of six foot diameter, driven by four individually corresponding 270 H.P. "Ford" engines adapted for marine use, affords a platform approximately 32 feet wide and 52 feet long for cargo use. The gross weight of the vehicle is approximately fifteen thousand pounds and the platform is about two feet thick, assembled with a skirt projecting about two feet below the ceiling of the air compression chamber under the platform. In FIGURE 16, a graph is presented wherein gross estimated weight in thousand of pounds of the vehicle is the abscissa and height of the lower edge of the skirt off the surface of the earth in inches is the ordinate. The gross estimated weight takes into account the vehicle and cargo load. The vehicle will rise and become airborne with only one of the four pumps on board in operation. Under these conditions, the air valve allied with the operating pump is maintained open by the pump operation while the three air valves corresponding to the three idle pumps are closed under spring bias of the valves. Thus, the air being delivered by the one operating pump passes into the compression chamber of the vehicle and is effective without appreciable back flow through the ducts associated with the idle pumps.

Since the pumps employed and their corresponding motors in accordance with the graph are of like rating, the comparison of the effect of having one or more of the engines in operation can be compared. It will be seen that with one of the lift pumps alone in operation at 750 r.p.m. under full throttle drive of its corresponding motor, the craft will be airborne although the distance above the earth is considerably less than when at least one additional pump is brought into operation. For each additional air pump made operative on board the vehicle, the related air valve in the air delivery duct leading to the compression chamber automatically opens while the valves associated with the idle pump or pumps remain closed under spring bias. With all four engines driving their lift pumps and with the engines operating at full throttle, the vehicle will rise somewhere between three and four feet above the ground. Of course, under the latter conditions of operations, all of the air duct valves are open so that air can be pumped by all of the pumps into the compression chamber.

Additional or fewer air lift inlet sections 15, with corresponding pumps 17 having motors 16 and air shut-off valves 150, may be employed in one of my air lift vehicles depending upon maximum cargo load and the desired maximum height of lift of the vehicle that is to be accomplished. Sometimes in accordance with the invention the same rated platform area is preserved under conditions of reduced available lifting power by substituting one or more of the area-increasing sections 20 for lift air inlet platform sections 15. A very considerable flexibility over assembly exists on this basis. The permissible variety of combinations of platform sections gives great latitude over the sizes and power capacities of the resulting vehicles. In omitting or adding certain of the platform sections to alter platform size, the skirt sections may likewise be omitted or added, for example through standardizing the skirt section sizes commensurate with the lengths of the sides of the platform sections which contribute to the periphery of the platform.

It will also be seen that by providing vehicles in accordance with this invention, which have platforms, whether sectional or otherwise, that exclude water from the insides of the platforms and are buoyant in water, the vehicles have great value for marine use and usually along with this property readily lend themselves to amphibian use. Thus, in certain instances the buoyant platform vehicles are employed to float on water, rise above the water, and travel under propulsion to other points where landings are made on water or land. Some of the craft in accordance with the invention are primarily for land use and while they can travel over water should not be brought down on water. Therefore, in some instances, the property of buoyance of the platform for water use is sometimes dispensed with, still with very appreciable advantages being had through the construction of strictly land vehicles. Even in vehicles for over land use alone, a foam resin filling in the sections frequently is used for the strength that it contributes to the platform. Sometimes, the skirts on the vehicles are employed as the landing gear, and for this the skirts are made strong enough to support the craft when the skirt edge contacts the ground. Vehicles which are built for use on water advantageously are constructed to remain afloat with reliance upon a buoyant platform, and the skirt conveniently immerses in the water when the craft is brought down.

As many possible embodiments may be made, and as many changes may be made in the embodiments hereinbefore set forth, it will be distinctly understood that all matter described herein is to be interpretated as illustrative and not as a limitation.

I claim:

1. In a motor vehicle adapted to be raised from the surface of the earth by gas pressure and to be propelled and steered while forming a lift gap with said surface from low altitude, the combination which includes a body having a downwardly open compression chamber for gas on the underneath side, a plurality of power lift units having intake sides open to the ambient air and output sides in communication with said compression chamber for said power lift units to move gas into the compression chamber, all of said power lift units and less than all of said power lift units being operable to lift and sustain the vehicle by the pressure of gas delivered in said chamber and thus produce a gap between said body and the surface of the earth for gas to escape from said chamber to atmosphere, and valves corresponding to said power lift units, each valve opening said compression chamber to atmosphere through the corresponding power lift unit in response to operation of the latter to deliver gas into said compression chamber and closing said compression chamber against the back-flow of gas from the compression chamber through the corresponding power lift unit in response to said corresponding power lift unit being rendered idle with at least one of said power lift units still operating, each of said valves including a plurality of slats having their opposite ends pivoted for said slats to rotate, said slats themselves being interconnected for rotation to open position in response to the corresponding power lift unit being operated to deliver gas into the compression chamber and each of said valves having a biasing spring for rotating the slats thereof to closed position when the corresponding power lift unit is rendered idle, for the slats of the related valve to arrest back-flow of gas from the compression chamber to atmosphere through the corresponding power lift unit.

2. In a motor vehicle adapted to be raised from the surface of the earth by air pressure and to be propelled and steered while forming a lift gap with said surface at low altitude, the combination which comprises a vehicle platform affording a deck surface and an underneath surface substantially parallel to said surface, a skirt carried by said platform, extending downwardly below said platform and forming an air compression chamber having said underneath surface of said platform for a ceiling, a plurality of air ducts extending vertically through said platform and interconnecting said compression chamber with the ambient air outside said chamber, pump means including rotary impellers having vertically extending shafts on the vertical axes of said ducts and having blades in said ducts to move air into the compression chamber, motor means for rotating all of said impellers and less than all of said impellers to move air into said compression chamber through all of said ducts and through less than all of said ducts to lift and sustain the vehicle by the pressure of air delivered in said chamber and thus produce a gap between the lower end of said skirt and the surface of the latter for air to escape from said chamber to atmosphere, and a plurality of valves across said ducts, each of said valves including a plurality of slats having their opposite ends pivoted for said slats to rotate between opening and closing positions with respect to a corresponding one of said ducts, said slats themselves being interconnected for rotation in unison to duct opening position in response to air pressure produced as an incident to operation of said pump means when said pump means is being operated to move air into said compression chamber through said ducts and each of said valves having a biasing spring for rotating the slats of the valve into closing position relative to the corresponding duct when said duct is excluded from an operation of said pump means to move air into said compression chamber through less than all of said ducts, thus arresting back-flow of air from the compression chamber to atmosphere through the corresponding duct excluded.

3. A ground effect machine adapted to be raised from a surface, said machine including a body having an upwardly extending downwardly open hollow underside, a plurality of inlets communicating with the same space within said hollow underside and each open to the atmosphere ambient to the machine, means for the machine to support itself in the atmosphere with said body forming a perimetrical gas escape gap with said surface, said means including a plurality of pressurizing means each in a corresponding one of said inlets for moving gas from the atmosphere ambient to the machine through said inlet into said hollow underside and maintaining gas under pressure in said hollow underside having ground effect, and the machine further including anti-backflow closure and biasing means, said anti-backflow closure and biasing means comprising for each of said inlets gas pressure responsive valve means communicating with said inlet for opening said inlet and for closing said inlet against the backflow of gas from said hollow underside through said inlet to the atmosphere ambient to the machine, and said anti-backflow closure and biasing means further comprising for each of said inlets, means biasing said valve means to close said inlet against backflow of gas from said hollow underside through said inlet to the atmosphere ambient to the machine, said pressurizing means and valve means of the inlet being in upstream-downstream communication with each other and said valve means opening said inlet in response to pressure transmitted in said inlet from said pressurizing means when said pressurizing means corresponding to said inlet operates to move gas to said hollow underside against the bias of said means biasing said valve means of the inlet.

4. A ground effect machine as set forth in claim 3, wherein the machine comprises a plurality of engines, and said plurality of pressurizing means include a plurality of air impellers each in a corresponding one of said inlets, said impellers being separately operable and having independent driven connections with different ones of said engines.

5. A ground effect machine of claim 3, wherein selectively all of said plurality of pressurizing means and less than all of said plurality of pressurizing means are operable for moving gas from the atmosphere ambient to the machine respectively through all of said inlets and through the corresponding less than all of said inlets into said same space within said hollow underside for the machine to support itself in the atmosphere with said body forming a perimetrical gas escape gap with said surface, and said anti-backflow closure and biasing means for any said inlet excluded from the movement of gas into said hollow underside maintains said inlet closed.

6. A ground effect machine adapted to be raised from a surface, said machine including a body having an upwardly extending downwardly open hollow underside, a plurality of inlets communicating with the same space within said hollow underside and each open to the atmosphere ambient to the machine, means for the machine to support itself in the atmosphere with said body forming a perimetrical gas escape gap with said surface, said means including a plurality of gas pressurizing means each in a corresponding one of said inlets for moving gas from the atmosphere ambient to the machine through said inlet into said hollow underside and maintaining gas under pressure in said hollow underside having ground effect, and the machine further including anti-backflow closure and biasing means comprising for each of said inlets a plurality of interconnected side-by-side coextending members, said members having their opposite ends pivoted relative to said inlet for said members to rotate opening said inlet in response to gas pressure, and said anti-backflow closure and biasing means further comprising for each of said inlets, biasing means connected with said members corresponding to said inlet and biasing said members normally to close said inlet against backflow of gas from said hollow underside through said inlet to the atmosphere ambient to the machine, said pressurizing means and coextending members in said inlet being in upstream-downstream communication with each other and said coextending members opening said inlet against said biasing means in response to pressure transmitted in said inlet from said corresponding pressurizing means when said pressurizing means corresponding to said inlet operates to move gas to said hollow underside.

7. A ground effect machine adapted to be raised from a surface, said machine including a body having an upwardly extending downwardly open hollow underside, a plurality of inlets communicating with the same space within said hollow underside and each open to the atmosphere ambient to the machine, means for the machine to support itself in the atmosphere with said body forming a perimetrical gas escape gap with said surface, said means including a plurality of air impellers, each said air impeller being in a corresponding one of said inlets for moving gas from the atmosphere ambient to the machine through said inlet into said hollow underside and maintaining gas under pressure in said hollow underside having ground effect, and the machine further including anti-backflow closure and biasing means comprising for each of said inlets a plurality of interconnected side-by-side coextending members, said members having their opposite ends pivoted relative to said inlet for said members to rotate opening said inlet in response to gas pressure, and said anti-backflow closure and biasing means further comprising for each of said inlets, biasing means connected with said members and corresponding to said inlet and biasing said members normally to close said inlet against backflow of gas from said hollow underside through said inlet to the atmosphere ambient to the machine, said impeller and coextending members in said inlet being in upstream-downstream communication with each other and said coextending members opening said inlet against said biasing means in response to pressure transmitted in said inlet from said corresponding impeller when said impeller corresponding to said inlet operates to move gas to said hollow underside.

8. A ground effect machine as set forth in claim 7, wherein the machine comprises a plurality of engines, and said plurality of air impellers being separately operable and having independent driven connections with different ones of said engines.

9. A ground effect vehicle adapted to be raised from a surface, said vehicle including a body having an upwardly extending downwardly open hollow underside, a plurality of inlets communicating with the same space within said hollow underside and each open to the atmosphere ambient to the vehicle, means for vertically lifting, horizontally propelling and steering the vehicle, said means including lift means for the vehicle to vertically lift itself by gas pressure in the region of ground effect only and support itself with said body forming a perimetrical gas escape gap with said surface, said lift means including a plurality of pressurizing means each in a corresponding one of said inlets for moving gas from the atmosphere ambient to the machine through said inlet into said hollow underside and maintaining gas under pressure in said hollow underside having ground effect, and said means for vertically lifting, horizontally propelling and steering the vehicle further including horizontal propulsion and steering means for horizontally propelling and steering the vehicle, and the vehicle further including anti-backflow closure and biasing means, said anti-backflow closure and biasing means comprising for each of said inlets gas pressure responsive valve means communicating with said inlet for opening said inlet and for closing said inlet against the backflow of gas from said hollow underside through said inlet to the atmosphere ambient to the vehicle, and said anti-backflow closure and biasing means further comprising for each of said inlets, means biasing said valve means to close said inlet against backflow of gas from said hollow underside through said inlet to the atmosphere ambient to the vehicle, said pressurizing means and valve means of the inlet being in upstream-downstream communication with each other and said valve means opening said inlet in response to pressure transmitted in said inlet from said pressurizing means when said pressurizing means corresponding to the inlet operates to move gas to said hollow underside against the bias of said means biasing said valve means of the inlet.

References Cited in the file of this patent

UNITED STATES PATENTS

| 936,395 | Worthington | Oct. 12, 1909 |
|---|---|---|
| 986,766 | Schroeder | Mar. 14, 1911 |
| 2,736,514 | Ross | Feb. 28, 1956 |
| 2,834,560 | Werner et al. | May 13, 1958 |
| 2,955,780 | Hulbert | Oct. 11, 1960 |
| 2,968,453 | Bright | Jan. 17, 1961 |
| 3,050,146 | Crim | Aug. 21, 1962 |

OTHER REFERENCES

Publication: "Aviation Week," July 6, 1959, pages 115 and 116.

Article appearing in Washington, D.C., "Evening Star," issue of Oct. 9, 1959, page B-8, columns 1 and 2, entitled "Test 'Flight' Nearing for Air Borne Boat."